(12) United States Patent
Cha et al.

(10) Patent No.: US 8,285,890 B2
(45) Date of Patent: *Oct. 9, 2012

(54) HOST DEVICE, A POINT OF DEPLOYMENT (POD), AND A METHOD OF IDENTIFYING AN OPERATION MODE

(75) Inventors: Sang Hoon Cha, Seongnam-si (KR); Kwang Hun Kwon, Yongin-si (KR); Sung Ho Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

This patent is subject to a terminal disclaimer.

(21) Appl. No.: 12/219,854

(22) Filed: Jul. 29, 2008

(65) Prior Publication Data

US 2010/0023985 A1    Jan. 28, 2010

Related U.S. Application Data

(60) Provisional application No. 60/952,845, filed on Jul. 30, 2007.

(51) Int. Cl.
| | |
|---|---|
| G06F 3/00 | (2006.01) |
| G06F 13/12 | (2006.01) |
| H04J 3/24 | (2006.01) |
| H04L 12/28 | (2006.01) |
| H04L 12/56 | (2006.01) |
| H04L 12/66 | (2006.01) |
| H04N 7/173 | (2011.01) |

(52) U.S. Cl. ............... 710/30; 710/16; 710/20; 710/62; 370/349; 370/389; 370/392; 370/395.5; 370/401; 370/463; 370/474; 725/109; 725/111

(58) Field of Classification Search ............... None
See application file for complete search history.

(56) References Cited

U.S. PATENT DOCUMENTS

| | | | | |
|---|---|---|---|---|
| 5,590,133 | A  * | 12/1996 | Billstrom et al. | 370/349 |
| 6,149,319 | A  * | 11/2000 | Richter et al. | 713/300 |
| 6,183,307 | B1 * | 2/2001  | Laity et al. | 439/676 |
| 6,481,629 | B1 * | 11/2002 | Hirabayashi et al. | 235/487 |
| 7,365,454 | B2 * | 4/2008  | Morrow | 307/140 |
| 7,839,886 | B2 * | 11/2010 | Cha et al. | 370/463 |
| 7,860,109 | B2 * | 12/2010 | Cha | 370/395.5 |
| 7,944,916 | B2 * | 5/2011  | Cha et al. | 370/389 |
| 7,944,917 | B2 * | 5/2011  | Cha | 370/389 |

(Continued)

OTHER PUBLICATIONS

OpenCable Specifications-CableCARD Interface 2.0 Specification (US OC-SP-CCIF2.0-0107-060803). Aug. 3, 2006.*

(Continued)

*Primary Examiner* — Chun-Kuan Lee
*Assistant Examiner* — Henry Yu
(74) *Attorney, Agent, or Firm* — McKenna Long & Aldridge LLP

(57) ABSTRACT

A host device, a point of deployment (POD), and a method for recognizing an operation mode are disclosed. The host device interfaces with a point of deployment (POD), and includes an interface unit and a controller. The interface unit includes CD1#, CD2#, VS1#, VS2#, VPP1, VPP2, and IPDET ports. The controller outputs a mode confirmation signal to the POD via the IPDET port, and identifies that the POD supports an Internet Protocol (IP) Card M-Mode when the mode confirmation signal has been applied to the VS1# and VS2# ports.

12 Claims, 12 Drawing Sheets

U.S. PATENT DOCUMENTS

| | | | | |
|---|---|---|---|---|
| 2001/0014092 A1* | 8/2001 | Suzuki et al. | | 370/389 |
| 2003/0084440 A1* | 5/2003 | Lownes | | 725/6 |
| 2005/0268324 A1* | 12/2005 | An | | 725/152 |
| 2006/0130110 A1* | 6/2006 | Cho et al. | | 725/111 |
| 2006/0209857 A1* | 9/2006 | Hicks, III | | 370/401 |
| 2007/0133541 A1* | 6/2007 | Jung et al. | | 370/392 |

OTHER PUBLICATIONS

CABLELABS: "Cablecard Interface 2.0 Specification", Opencable Specifications, [Online] No. OC-SP-CCIF2.0-I07-060803, pp. 1-300, XP002487545: Retrieved from the Internet: URL:http://www.opencable.com/downloads/spe [retrieved on Aug. 3, 2006], pp. 30-36.

* cited by examiner

FIG. 5A

| | Single-stream host | Multi-stream host |
|---|---|---|
| S-CARD | S-Mode | Host may reject S-CARD* |
| M-CARD | S-Mode | M-Mode |

FIG. 5B

|  | Single-stream IP Card host | Multi-stream IP Card host |
|---|---|---|
| IP-S-Card | S-Mode | S-Mode or host may reject IP-S-Card |
| IP-M-Card | S-Mode | M-Mode |

FIG. 6A

| Pin # | CEA-679C part B | | PC Card Mode | | S-Mode | | M-Mode | |
|---|---|---|---|---|---|---|---|---|
| | Signal and Pin name | Card Input or output | Signal and Pin name | Card Input or output | Signal and Pin name | Card Input or output | Signal and Pin name | Card Input or output |
| 1 | GND | DC gnd | GND | DC gnd | GND | DC gnd | GND | DC gnd |
| 2 | D3 | I/O | D3 | I/O | D3 | I/O | | |
| 3 | D4 | I/O | D4 | I/O | D4 | I/O | | |
| 4 | D5 | I/O | D5 | I/O | D5 | I/O | | |
| 5 | D6 | I/O | D6 | I/O | D6 | I/O | | |
| 6 | D7 | I/O | D7 | I/O | D7 | I/O | | |
| 7 | CE1# | I | CE1# | I | CE1# | I | | |
| 8 | A10 | I | A10 | I | | | | |
| 9 | OE# | I | OE# | I | OE# | I | | |
| 10 | A11 | I | A11 | I | | | | |
| 11 | A9 | I | A9 | I | DRX | I | DRX | I |
| 12 | A8 | I | A8 | I | CRX | I | CRX | I |
| 13 | A13 | I | A13 | I | | | MOCLK | O |
| 14 | A14 | I | A14 | I | MCLKO | O | | |
| 15 | WE# | I | WE# | I | WE# | I | | |
| 16 | IREQ# | O | READY | O | IREQ# | O | | |
| 17 | VCC | | VCC | DC in | VCC | DC in | VCC | DC in |
| 18 | VPPI | | VPPI | DC in | VPPI | DC in | VPPI | I |
| 19 | MIVAL | I | A16 | I | MIVAL | I | | |
| 20 | MCLKI | I | A15 | I | MCLKI | I | | |
| 21 | A12 | I | A12 | I | | | MICLK | I |
| 22 | A7 | I | A7 | I | QTX | O | QIX | O |
| 23 | A6 | I | A6 | I | ETX | O | ETX | O |
| 24 | A5 | I | A5 | I | ITX | O | ITX | O |
| 25 | A4 | I | A4 | I | CIX | I | CTX | I |

FIG. 6B

| Pin # | CEA-679C part B | | PC Card Mode | | S-Mode | | M-Mode | |
|---|---|---|---|---|---|---|---|---|
| | Signal and Pin name | Card Input or output | Signal and Pin name | Card Input or output | Signal and Pin name | Card Input or output | Signal and Pin name | Card Input or output |
| 26 | A3 | I | A3 | I | | | | |
| 27 | A2 | I | A2 | I | | | SCTL | I |
| 28 | A1 | I | A1 | I | A1 | | SCTK | I |
| 29 | A0 | I | A0 | I | A0 | | SDI | I |
| 30 | D0 | I/O | D0 | I/O | D0 | I/O | | |
| 31 | D1 | I/O | D1 | I/O | D1 | I/O | | |
| 32 | D2 | I/O | D2 | I/O | D2 | I/O | | |
| 33 | IOIS16# | | WP | O | IOIS16# | O | MDET | O |
| 34 | GND | | GND | DC | GND | DC | GND | DC |
| 35 | GND | | GND | DC | GND | DC | GND | DC |
| 36 | CD1# | | CD1# | O | CD1# | O | CD1# | O |
| 37 | MDO3 | O | D11 | I/O | MDO3 | O | MDO3 | O |
| 38 | MDO4 | O | D12 | I/O | MDO4 | O | MDO4 | O |
| 39 | MDO5 | O | D13 | I/O | MDO5 | O | MDO5 | O |
| 40 | MDO6 | O | D14 | I/O | MDO6 | O | MDO6 | O |
| 41 | MDO7 | O | D15 | I/O | MDO7 | O | MDO7 | O |
| 42 | CE2# | I | CE2# | I | CE2# | I | | |
| 43 | VS1# | O | VS1# | O | VS1# | O | VS1# | O |
| 44 | IORD# | I | RFU | | IORD# | I | | |
| 45 | IOWR# | I | RFU | | IOWR# | I | | |
| 46 | MISTRT | I | A17 | I | MISTRT | I | MISTRT | I |
| 47 | MDI0 | I | A18 | I | MDI0 | I | MDI0 | I |
| 48 | MDI1 | I | A19 | I | MDI1 | I | MDI1 | I |
| 49 | MDI2 | I | A20 | I | MDI2 | I | MDI2 | I |
| 50 | MDI3 | I | A21 | I | MDI3 | I | MDI3 | I |
| 51 | VCC | | VCC | DC in | VCC | DC in | VCC | DC in |
| 52 | VPP2 | | VPP2 | DC in | VPP2 | DC in | VPP2 | DC in |
| 53 | MDI4 | I | A22 | I | MDI4 | I | MID4 | I |
| 54 | MDI5 | I | A23 | I | MDI5 | I | MDI5 | I |
| 55 | MDI6 | I | A24 | I | MDI6 | I | MDI6 | I |
| 56 | MDI7 | I | A25 | I | MDI7 | I | MDI7 | I |
| 57 | MCKLO | I | VS2# | O | VS2# | O | VS2# | I/O |
| 58 | RESET | O | RESET | I | RESET | I | RESET | |
| 59 | WAIT# | O | WAIT# | O | WAIT# | O | | |
| 60 | INPACK# | O | RFU | | INPACK# | O | SDO | O |
| 61 | REG# | I | REG# | I | REG# | I | | |
| 62 | MOVAL | O | BVD2 | O | MOVAL | O | | |
| 63 | MOSTRT | O | BVD1 | O | MOSTRT | O | MOSTRT | O |
| 64 | MDO0 | O | D8 | I/O | MDO0 | O | MDO0 | O |
| 65 | MDO1 | O | D9 | I/O | MDO1 | O | MDO1 | O |
| 66 | MDO2 | O | D10 | I/O | MDO2 | O | MDO2 | O |
| 67 | CD2# | | CD2# | O | CD2# | O | CD2# | O |
| 68 | GND | | GND | DC | GND | DC | GND | ground |

FIG. 8

| VPP1 | VPP2 | Card configuration |
|------|------|--------------------|
| Low  | High | M-Mode |
| Low  | Low  | IP Card M-Mode |
| High | Low  | Reserved |
| High | High | S-Mode |

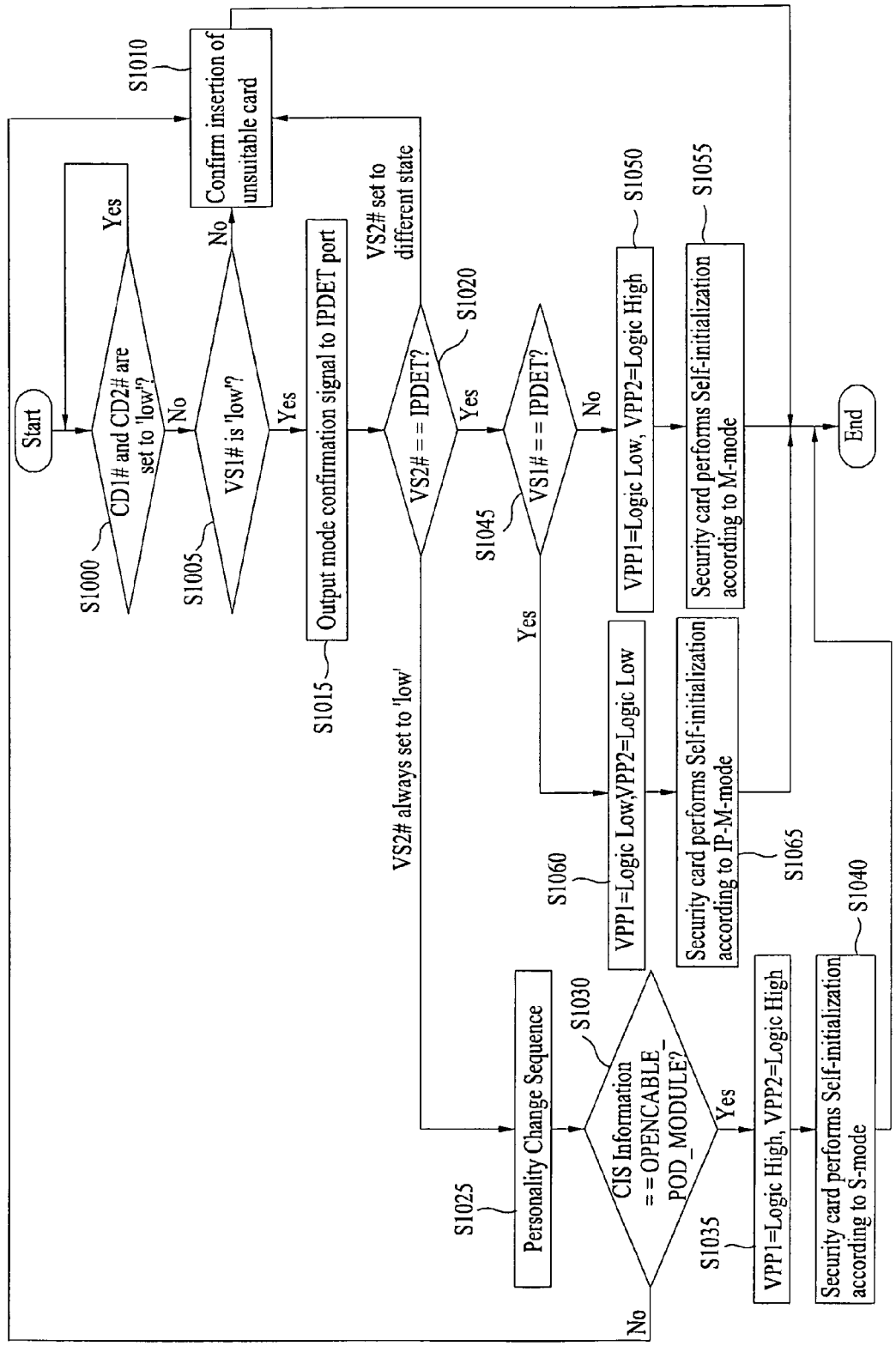

HOST DEVICE, A POINT OF DEPLOYMENT (POD), AND A METHOD OF IDENTIFYING AN OPERATION MODE

This application claims the benefit of the U.S. Provisional Application No. 60/952,845, filed on Jul. 30, 2007, which is hereby incorporated by reference as if fully set forth herein.

BACKGROUND OF THE INVENTION

1. Field of the Invention

The present invention relates to a host device, POD (point of deployment) and a method of identifying an operation mode. Although the present invention is suitable for a wide scope of applications, it is particularly suitable for using Internet.

2. Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV). The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a host device, POD (point of deployment) and a method of identifying an operation mode that substantially obviate one or more problems due to limitations and disadvantages of the related art.

An object of the present invention is to provide a host device, POD (point of deployment) and a method of identifying an operation mode, by which data received via internet can be processed.

Another object of the present invention is to provide a host device, POD (point of deployment) and a method of identifying an operation mode, by which a mode of POD capable of processing data received via internet can be determined.

Another object of the present invention is to provide a host device, POD (point of deployment) and a method of identifying an operation mode, by which an M-Mode of POD capable of processing data received via internet can be determined.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a host device, which interfaces with a POD (point of deployment), according to the present invention includes an interface unit which includes CD1#, CD2#, VS1#, VS2#, VPP1, VPP2, and IPDET ports, and a controller which outputs a mode confirmation signal to the POD via the IPDET port, and identifies that the POD supports an Internet Protocol (IP) Card M-Mode when the mode confirmation signal has been applied to the VS1# and VS2# ports.

Also, the controller, if the POD supports the IP Card M-mode, sets the VPP1 port to 'Logic Low', and sets the VPP2 port to 'Logic Low'.

Also, the controller detects status information of the CD#1 and CD2# ports, such that it determines whether the POD was inserted according to the detected status information.

Also, the controller outputs the mode confirmation signal when insertion of the POD is confirmed.

Also, the controller toggles the IPDET port to control the output of the mode confirmation signal.

In another aspect of the present invention, a point of deployment (POD) interfacing with a host device, includes an interface unit which includes CD1#, CD2#, VS1#, VS2#, VPP1, VPP2, and IPDET pins, and outputs a signal received via the IPDET pin to the VS1# and VS2# pins, and a controller which detects status information of the VPP1 and VPP2 pins, determines whether the host device supports an Internet Protocol (IP) Card M-Mode according to the detected status information, and performs initialization according to the determined result.

Also, the controller, if the VPP1 pin is set to 'Logic Low' and the VPP2 pin is set to 'Logic Low', determines that the host device supports the IP Card M-Mode.

Also, if the POD is inserted into the host device, each of the CD1# and CD2# pins is set to 'Logic Low'.

In another aspect of the present invention, a method for recognizing an operation mode, includes a) determining whether a point of deployment (POD) is inserted; b) if the point of deployment (POD) has been inserted, outputting a mode confirmation signal to the point of deployment (POD) via an IPDET port; c) determining whether the mode confirmation signal is applied to VS1# and VS2# ports; and d) if the mode confirmation signal has been applied to the VS1# and VS2# ports, determining that the point of deployment (POD) supports an Internet Protocol (IP) Card M-Mode.

Also, the method further includes if the point of deployment (POD) supports the IP Card M-Mode at the step d), setting a VPP1 port to 'Logic Low' and setting a VPP2 port to 'Logic Low'.

Also, the step a) of determining whether the POD is inserted includes detecting status information of CD1# and CD2# ports, and determining whether the point of deployment (POD) is inserted according to the detected status information.

Also, the step b) of outputting the mode confirmation signal includes outputting the mode confirmation signal by toggling the IPDET port.

Therefore, by a host device, POD (point of deployment) and a method of identifying an operation mode according to the present invention, a mode of POD capable of processing data received via internet can be efficiently determined.

And, a mode of a POD (point of deployment) capable of processing data received via internet can be determined by maintaining compatibility with conventional CableCard.

Moreover, the present invention need not allocate additional pins, and at the same time discriminates not only the S- and M-Modes of the conventional POD but also another M-Mode capable of processing data received via the Internet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A and FIG. 5B are tables for operating modes mapped according to a combination between security CARD and host device, respectively;

FIG. 6A and FIG. 6B are tables for card interface pin assignment of cards using PC card form, respectively;

FIG. 8 is a table for a signal supplied to a security CARD to inform the security CARD of an operation mode identified by a host device;

FIG. 10 is a diagram for performing a method of identifying an operation mode according to another embodiment of the present invention.

DETAILED DESCRIPTION OF THE INVENTION

Figure 1:
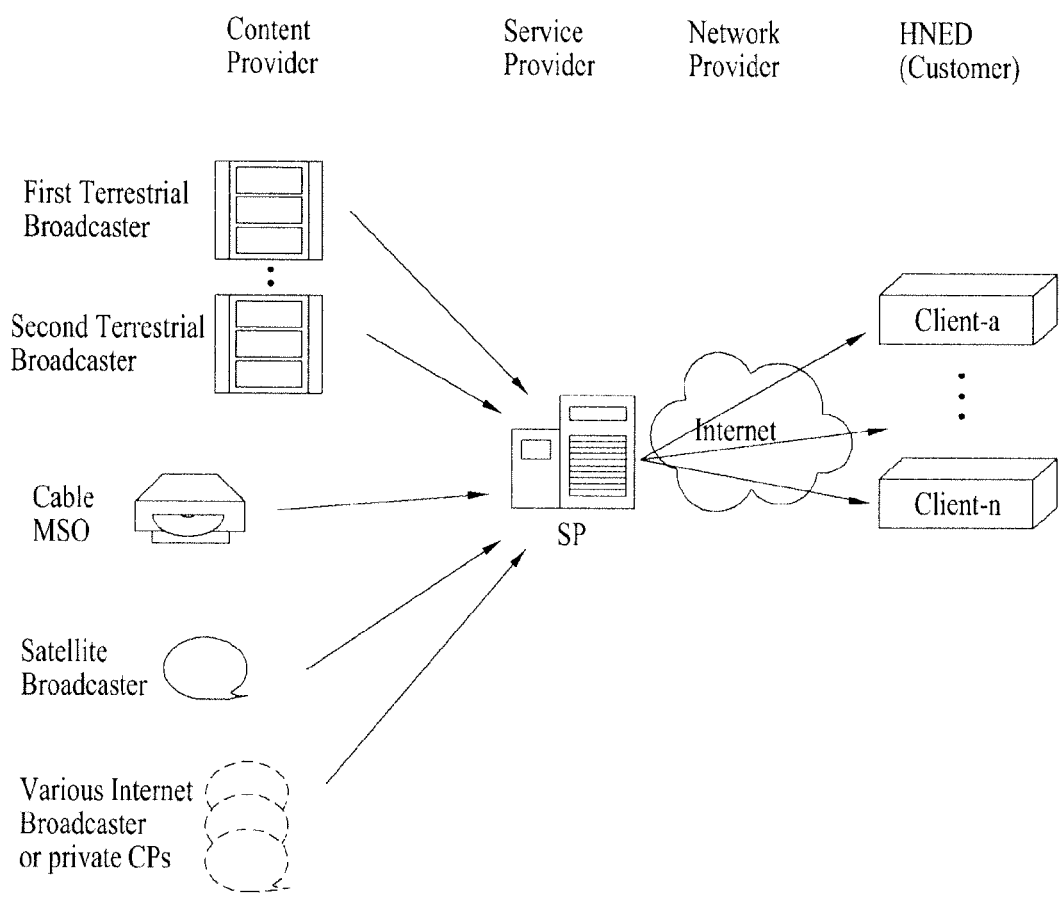
FIG. 1 is a schematic diagram of an IPTV system according to one embodiment of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
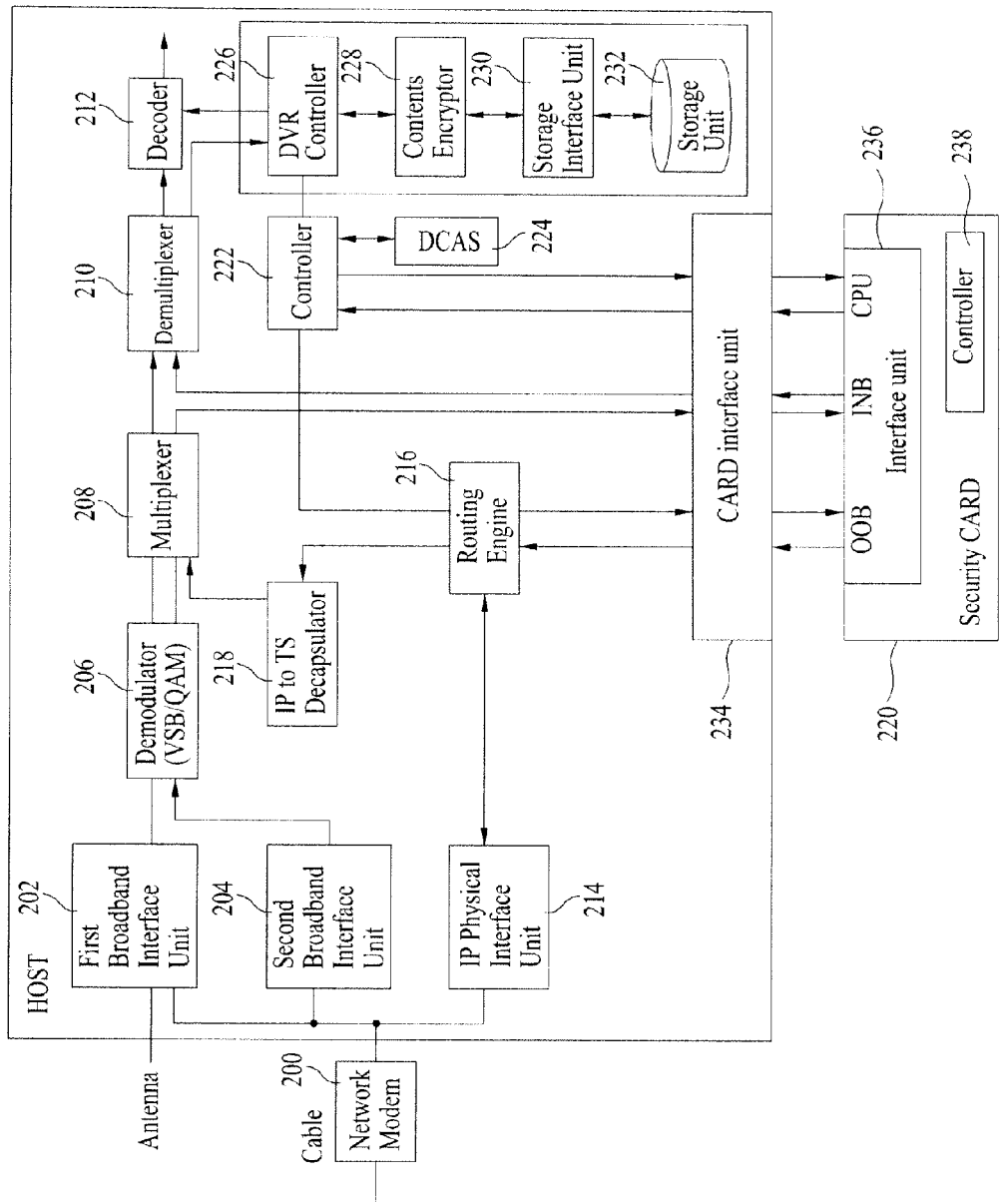
FIG. 2 is a schematic diagram of a receiver using a security CARD 220 according to one embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The broadcast receiver shown in FIG. 2 mainly includes a host device and a security card. The host device includes a first broadband interface unit 202, a second broadband interface unit 204, a demodulator 206, a multiplexer 208, a demultiplexer 210, a decoder 212, an IP physical interface unit 214, a routing engine 216, an IP to transport packet decapsulator 218, a controller 222, a DCAS (Downloadable CAS) unit 224, a DVR (Digital Video Recorder) controller 226, a content encryption unit 228, a storage interface unit 230, a storage unit 232 and a card interface unit 234.

The security card 220 can include a single stream card capable of processing a single stream only or a multi-stream card capable of processing a plurality of streams simultaneously. And, the security card 220 can include the interface unit 236 and the controller 238. For instance, the security card 220 can be implemented with a cable card (CableCard) or a smart card.

The broadcast receiver corresponds to an open cable system in which a security card including a conditional access (CA) system is separated from a main frame. The security card may be called a POD (point of deployment) module and is detachably loaded in a main frame slot of the broadcast receiver. And, the main frame having the security card loaded therein may be called a host device. In particular, the broadcast receiver includes both of the security card and the host device.

The host shown in FIG. 2 exemplarily corresponds to a multi-stream host for processing a plurality of streams. In case of a single stream host for processing a single stream, the multiplexer 208 and the demultiplexer 210 make a CMP (cablecard MPEG packet) and the like by attaching a local header in order for the host shown in FIG. 2 to process a multi-stream and a process for multiplexing and demultiplexing them is bypassed. Yet, in case of the single stream host, other operations explained in the description of the present invention are performed in the same manner. A single stream card capable of processing a single stream only can be used as the security card 220. Alternatively, a multi-stream card capable of processing a plurality of streams simultaneously can be used as the security card 220.

A network connecting unit 200 plays a role in connecting an external network and a broadcast receiver to each other. For instance, the broadcast receiver can be connected to the external network using DOCSIS modem. Alternatively, the broadcast receiver can be connected to the external network using a wireless relay unit connected to a wireless internet network or a wireline relay unit connected to a wireline internet network such as a wireless ADSL relayer and the like. The examples for the connection with the external network are just exemplary. Which one of the examples will be used may depend on how it will be connected to the external network.

Figure 3:
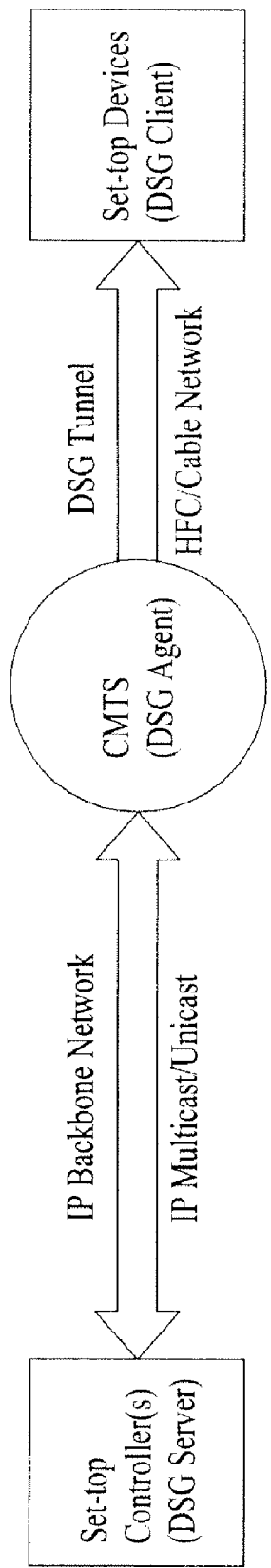
FIG. 3 is a configurational diagram of a broadcast receiver connected to an external network using DOCSIS modem according to the present invention.

FIG. 3 is a configurational diagram of a broadcast receiver connected to an external network using DOCSIS modem according to the present invention.

Referring to FIG. 3, in case that the network connecting unit 200 is implemented with a DOCSIS modem, a broadcast receiver according to the present invention can interoperate with DOCSIS network. In particular, the network connecting unit 200 forms a DSG channel with a CMTS (DSG agent) relaying a data broadcast received from a set-top controller (DSG server) via DOCSIS network and is then able to receive broadcast data via the DSG tunnel. In this case, the DOCSIS network can be implemented with IP backbone network and is able to support IP multicast/unicast.

Yet, in order to support the IP multicast/unicast via the DOCSIS network, a packet received from the CMTS (DSG agent) should be transmitted by being converted to a DSG packet. Therefore, it is a problem that the broadcast receiver is unable to receive broadcast data by being directly connected to an external IP network.

In order to solve this problem, the network connecting unit 200 is able to provide a function for enabling the broadcast receiver to be directly connected to the external IP network.

For example, it is able to implement the network connecting unit 200 with MoCA (multimedia over coax alliance). In case of implementing the network connecting unit 200 with the MoCA (multimedia over coax alliance), an IP based network is established on a coaxial cable network and is then connectible. In particular, in case of implementing the network connecting unit 200 with the MoCA multimedia over coax alliance), DOCSIS network may not be used. It is unnecessary to use the DOSCIS modem. And, it is unnecessary to use the CMTS connected with the DOCSIS modem on a network. Moreover, it is unnecessary to use the DSG tunnel formed between the DOCSIS modem and the CMTS. Thus, it is able to implement seamless IP based connectivity on a coaxial network. Therefore, the broadcast receiver according to the present invention uses IP over coax, thereby enabling a user to be provided with a fast and stable broadcast service.

The IP physical interface unit 214 receives an Ethernet frame packet, which is transmitted to a specific IP address, of a signal received through the network connecting unit 200 and then forwards the received packet to the routing engine 216. Alternatively, the IP physical interface unit 214 receives data (e.g., pay program request, state information of receiver, user input, etc.) according to bi-directional communication from the routing engine 216 and then transmits the received data to an external network through the network connecting unit 200. In this case, the specific IP address can be an IP address of the host device itself or an IP address of the security card.

In case of the broadcast receiver shown in FIG. 2, IP broadcast data according to an IP protocol, a VOD (video on demand) signal or an OOB (out of band) message signal can be received via the IP physical interface unit 214. In case of a conventional cable broadcast, such an OOB message as SI (system information), EAS (emergency alert system), XAIT (extended application information table), conditional access system information, various kinds of card control information and the like is received using DSG (DOCSIS settop gateway) or OOB (out of band) system.

In case of the broadcast receiver shown in FIG. 2, the OOB message can be received in a manner of providing DOCSIS modem, OOB tuner or the like within the host device. For instance, OOB message can be received using either IP system or OOB system. Alternatively, OOB message can be received using IP system, DSG system or OOB system.

In case of receiving OOB message using either IP system or OOB system, the broadcast receiver shown in FIG. 2 further needs an OOB tuner, a demodulator and the like. In case of receiving OOB message using IP system, DSG system or OOB system, the broadcast receiver shown in FIG. 2 further needs DOCSIS modem, OOB tuner, a switching unit for selecting the DSG system or the OOB system, a demodulator for transmitting data to a head end side according to the corresponding system, and the like.

Whether to use a case of using the IP system, the conventional DSG system or the OOB system or a case of using the IP or OOB system except the DSG system is decided by a transmitting side. And, a result of the decision is then transmitted to the security card 220. If so, it is able to solve the problem of backward capability as well.

The OOB message in the above description is just exemplary. According to implementations, other necessary information is added as well as the above exemplary information or unnecessary information can be removed from the above exemplary information.

The routing engine 216 routes each packet transmitted by the IP physical interface unit 214 to a destination of the corresponding packet. For instance, the routing engine 216 is able to route the packet to the destination using TCP/IP (transmission control protocol/internet protocol) based network stack and the like. The routing engine 216 can support both of the TCP/IP and UDP/IP (user datagram protocol/internet protocol). And, the routing engine 216 is able to perform discrimination between in-band data and OOB data using packet header information, jitter filtering and the like.

Figure 4:
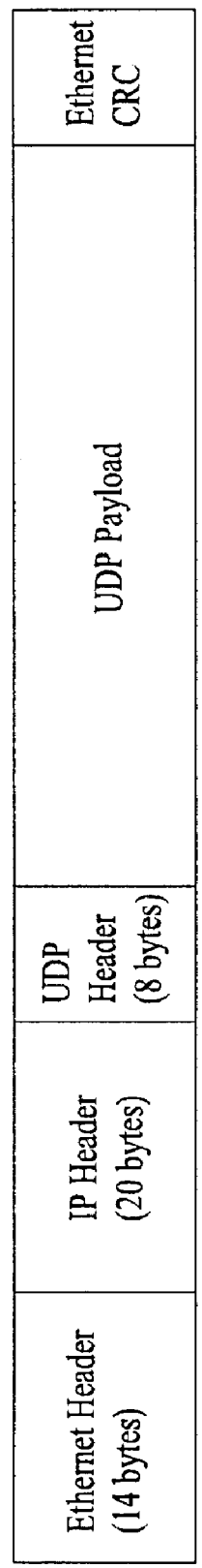
FIG. 4 is a structural diagram of an Ethernet frame according to one embodiment of the present invention.

FIG. 4 is a structural diagram of an Ethernet frame according to one embodiment of the present invention. The routing engine 216 receives an Ethernet frame having the structure shown in FIG. 4. The frame includes a 14-byte Ethernet header, a 20-byte IP header, an 8-byte UDP header, a payload, an Ethernet CRC (cyclic redundancy check) and the like. In case of transmitting data according to TCP instead of UDP, a TCP header is usable instead of the UDP header. And, a TCP payload can be received by being included in the data instead of the UDP payload. The payload can include in-band data, OOB data and the like.

The routing engine 216 performs routing by discriminating the data received in the format shown in FIG. 4 into in-band data and OOB data. In order to discriminate the in-band data and the OOB data from each other, header information by agreement between transmitting and receiving sides and the like is usable. Each of the discriminated in-band and OOB data can be routed to the data destination using a second, third or fourth layer.

In case of using the second layer routing, routing is performed using a MAC (media access control) address system of a destination contained in an Ethernet header of a received Ethernet frame.

In case of using the fourth layer routing, routing is performed using a port of a destination contained in a UDP header of a received Ethernet frame. If the Ethernet frame contains a TCP header, routing is performed using a TCP port of a destination.

Whether to use the second layer routing or the third layer routing may be changed according to an implementation example. In particular, according to the implementation example, the second, third or fourth layer routing system can be used.

For instance, in case of using the second layer routing, in the data used by the host device among the received data, MAC address information of the host device is contained in an Ethernet header. In case of using the third layer routing, in the data used by the host device among the received data, MAC address information of the host device is contained in an IP header. In case of using the fourth layer routing, in the data used by the host device among the received data, a port number is contained in a UDP or TCP header.

In-band data including audio, video and data broadcast data and the like in the data received by the routing engine 216 is routed to the IP to TS decapsulator 218. In the case, the in-band data can be an MPEG TS coded by MPEG coding or a stream coded by a different coding scheme.

The IP to TS decapsulator 218 parses the received MPEG (moving picture expert group) or MPEG-2 based TO packet and then outputs the parsed packet to the multiplexer 208. A process after the multiplexer 208 will be described later. In the above example, the MPEG-2 based broadcast data is assumed. So, the TP packet is received and then parsed. Yet, in case that broadcast data using a different specification is received, a unit different from a TP packet unit is usable. Therefore, the above idea of the present invention is not restricted by the terminology according to the implementation example.

The routing engine 216 transmits a packet, of which destination is the security card 220, to the security card 220. The OOB (out of band) message corresponding to one of the packets, of which destination is the security card 220, is routed by the routing engine 216 and is then transmitted to the security card 220. In case of routing the OOB message to the security card 220, it is able to transmit the data to the security card 220 by the second, third or fourth layer routing.

The first broadband interface unit 202 tunes to a specific channel frequency of a terrestrial A/V (audio/video) broadcast transmitted via antenna or a cable A/V broadcast transmitted by in-band through a cable connected to the network connecting unit 200 and then outputs the corresponding broadcast to the demodulator 206.

In this case, since the terrestrial broadcast and the cable broadcast differ from each other in transmission scheme, they differ from each other in a demodulation scheme by the demodulator 206. For instance, the terrestrial A/V broadcast is modulated by VSB (vestigial sideband modulation) scheme and is then transmitted. The cable A/V broadcast is modulated by QAM (quadrature amplitude modulation) scheme and is then transmitted.

Therefore, if the channel frequency tuned by the first broadband interface unit 202 corresponds to the terrestrial broadcast, the corresponding broadcast is demodulated by VSB in the demodulator 206. If the channel frequency tuned by the first broadband interface unit 202 corresponds to the cable broadcast, the corresponding broadcast is demodulated by QAM in the demodulator 206.

The second broadband interface unit 204 tunes to a specific channel frequency of a cable A/V broadcast transmitted by in-band through a cable connected to the network connecting unit 200 and then outputs the corresponding broadcast to the demodulator 206.

Each of the first and second broadband interface unit 202 and 204 tunes to a signal on a different channel and then transmits the tuned signal to the demodulator 206. Alternatively, a different A/V stream of the same channel of the first broadband interface unit 202 is tuned and then transmitted to the demodulator 206.

For instance, the first broadband interface unit 202 tunes a stream of a main picture and the second broadband interface unit 204 tunes a stream of PIP (picture in picture) In case of storing a digital video signal using DVR (digital video recorder) or the like, if both of the first and second broadcast interface units 202 and 204 are used, a video can be viewed while a video signal is stored.

The demodulator 206 demodulates the received signal and then transmits the demodulate signal to the multiplexer 208.

The multiplexer 208 multiplexes the signal inputted by the demodulator 206 with the signal inputted by the IP to TP decapsulator 218 and then outputs the multiplexed signal. For instance, the main video tuned and demodulated by the first broadband interface unit 202 and the PIP video tuned and demodulated by the second broadband interface unit 204 are multiplexed together and then outputted. Alternatively, according to an implementation example, a video of a different channel can be multiplexed. Alternatively, it is multiplexed with the signal inputted by the IP to TP decapsulator 218 and is then outputted.

If the signal outputted by the multiplexer 208 is the terrestrial broadcast data, the inputted signal is outputted to the demultiplexer 210. If the signal outputted by the multiplexer 208 is the cable broadcast or IPTV broadcast data, it is outputted to the demultiplexer 210 via the security card 220 loaded in the slot. The security card 220 includes a conditional access 9CA) system for copy prevention and conditional access to a high value-added broadcast content and can be called a POD (point of deployment) module.

In particular, if the received broadcast data is scrambled, the security card 220 descrambles the scrambled data and then outputs the descrambled data to the demultiplexer 210. If the security card 220 is not loaded, the A/V broadcast data outputted by the multiplexer 208 is directly outputted to the demultiplexer 210. In this case, since it is unable to descramble the scrambled A/V broadcast data, it is unable to normally view the corresponding data.

According to an implementation example of the host device, IP packets containing A/V data of several channels can be simultaneously received. In particular, if the host device is implemented with a multi-stream host device for processing a plurality of streams, the host device can receive IP packets containing A/V data of several channels simultaneously.

In this case, the multiplexer 208 multiplexes the data contained in the IP packets of the different channels together by giving LTSID to each of the data. In this case, the LTSID is identification information used in identifying a corresponding stream data. For instance, if the multiplexer 208 receives the IP packet shown in FIG. 4, it is able to give LTSID mapped to each MPEG-TS using routing index information pre-agreed with a server transmitting data, a headend and the like.

The security card 220 discriminates data is able to perform CA descrambling by discriminating data using the LTSID. And, the host can accurately route the data using the LTSID.

In this case, the routing index information can be received via such a network as Server and HeadEnd and the like. The routing index information can include an IP address list or a port list. And, the routing index information can include a list for IP address and ports relevant to the IP address. Moreover, the security card 220 should be able to support IP (internet protocol) card M-mode capable for processing IP packets containing A/V data of several channels simultaneously. For instance, the security card 220 supporting the IP (internet protocol) card M-mode can include an IP-M-card.

In case that the host device is a single stream host device for processing a single stream, the host device is able to receive an IP packet containing A/V data of a single channel. And, the security card 220 should be able to support IP (internet protocol) card S-mode capable of processing an IP packet containing A/V data of a single channel. For instance, the security card 220 supporting IP (internet protocol) card S-mode can include an IP-S-card. In some cases, IP-M-card can support IP (internet protocol) card S-mode.

The demultiplexer 210 separates the inputted video data and the inputted audio data from each other and then outputs the separated data to the decoder 212. The decoder 212 reconstructs the compresses A/V signal into an original signal through video decoding algorithm and audio decoding algorithm and then outputs the reconstructed signal to be displayed.

The DVR controller 226, the content encryption unit 228, the storage interface unit 230 and the storage unit 232 play roles in storing the received data or playing back the stored data.

The DVR controller 226 controls video data, which are selected from the data outputted from the demultiplexer 210, and the like to be stored or controls video data, which is selected from the stored data, to be played back, under the control of the controller 222.

The content encryption unit 228 encrypts data to be stored and then outputs the encrypted data. The content encryption unit 228 reconstructs the encrypted and stored data and then outputs the reconstructed data. And, the encryption unit 228 may not be used according to an implementation example.

The storage interface unit 230 performs data input/output interfacing with the storage unit 232. And, the storage unit 232 stores the inputted data therein.

The DCAS unit 224 downloads a conditional access system (CAS) from a transmitting side server and then stores the downloaded data therein. The DCAS unit 224 performs a conditional access function according to an appropriate conditional access system among the stored conditional access systems.

And, the controller 222 controls an interface between the host device and the security card, data processing of the host device and the like.

FIG. 5A and FIG. 5B are tables for operating modes mapped according to a combination between security CARD and host device, respectively.

Referring to FIG. 5A and FIG. 5B, security cards can be discriminated into S-card, M-card, IP-S-card and IP-M-card. And, host devices can be discriminated into a single stream host, a multi-stream host, a single stream IP card host and a multi-stream IP card host. In case that a security card is provided to a host device, the host recognizes a mode of the security card, determines the recognized mode and then identifies a corresponding operation mode. In this case, the operation mode can be classified into S-mode, M-mode, IP card S-mode and IP card M-mode.

If a host device is a single stream host and if a security card is S-card, an operation mode can become an S-mode. If a host device is a single stream host and if a security card is M-card, an operation mode can become an S-mode. If a host device is a multi-stream host and if a security card is M-card, an operation mode can become an M-mode.

If a host device is a single stream IP card host and if a security card is IP-S-card, an operation mode can become an IP card S-mode. If a host device is a single stream IP card host and if a security card is IP-M-card, an operation mode can become an IP card S-mode. If a host device is a multi-stream IP card host and if a security card is IP-M-card, an operation mode can become an IP card M-mode.

FIG. 6A and FIG. 6B are tables for card interface pin assignment of cards using PC card form, respectively.

Referring to FIG. 6A and FIG. 6B, S-mode of a conventional cable card follows the pin configuration shown in the table shown in FIG. 6. CD1#, CD2#, VS1#, VS2#, VPP1 and VPP2 are assignment of specific pins of a conventional cable card. And, CD1#, CD2#, VS1#, VS2#, VPP1 and VPP2 can becomes assignment of specific pins in IP card S-mode and IP-card M-mode of a security card. In particular, the interface unit 234 of the security card can include CD1#, CD2#, VS1#, VS2#, VPP1 and VPP2 pins.

Figure 7:
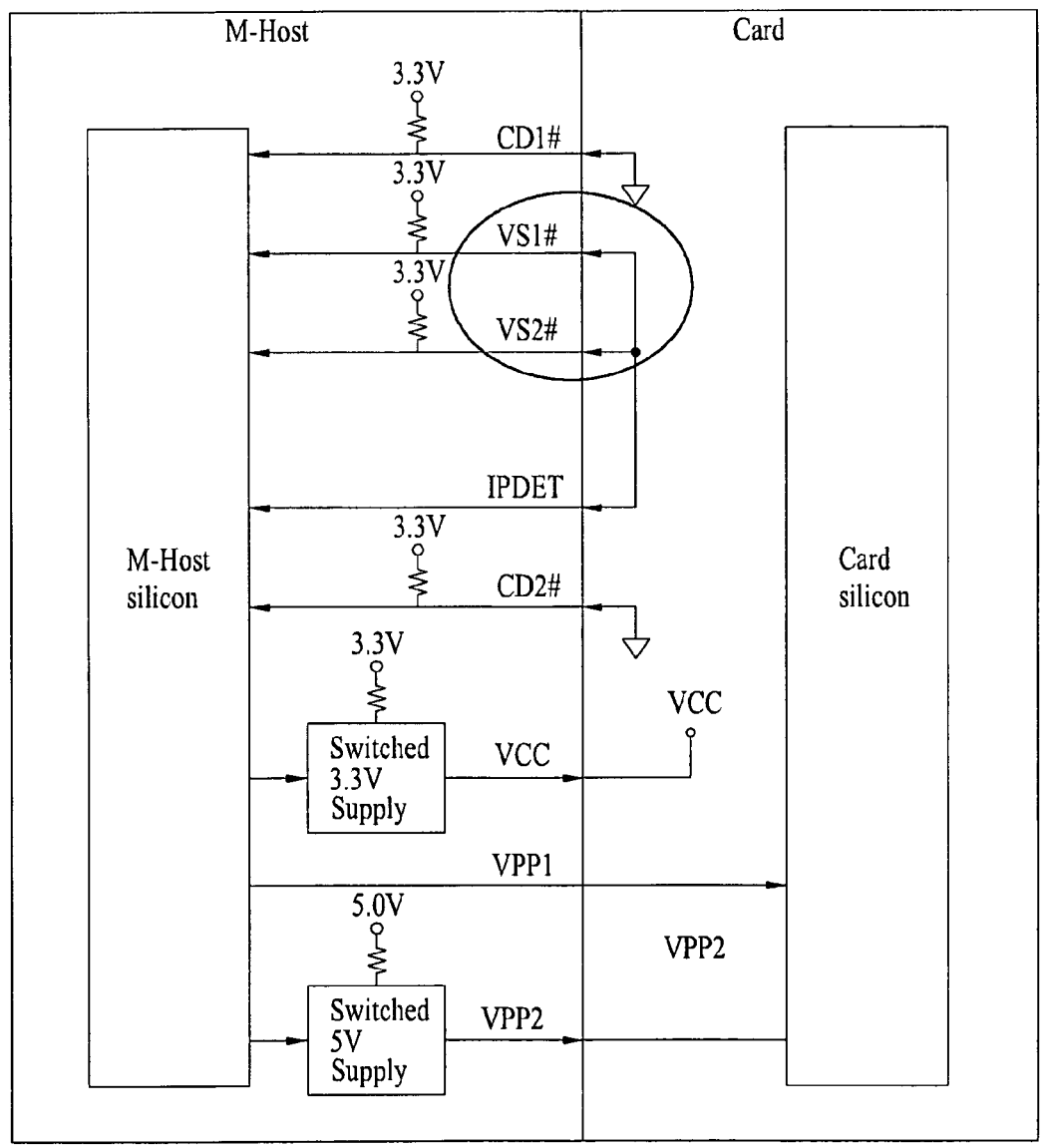
FIG. 7 is a diagram of an interface between a host device and a security CARD.

FIG. 7 is a diagram of an interface between a host device and a security CARD.

Referring to FIG. 7, the CARD interface unit 234 may include a plurality of ports (CD1#, CD2#, VS1#, VS2#, VPP1, VPP2, VCC, and IPDET). In correspondence with the above-mentioned ports, the interface unit 236 of the security card may include a plurality of pins (CD1#, CD2#, VS1#, VS2#, VPP1, VPP2, VCC, and IPDET).

If the security card is the IP-M-CARD, the interface unit 236 of the security card may include the IPDET pin, the VS1# pin, and the VS2# pin, such that the VS1# and VS2# pins are connected to the IPDET pin.

If the IPDET pin is connected to the above VS1# and VS2# pins in the security card, the controller 222 outputs a mode confirmation signal to the point of deployment (POD) via the ISO16# port, and the mode confirmation signal is applied to the VS1# and VS2# ports. In other words, if the security card is mounted to the host device, the controller 222 outputs the mode confirmation signal to the POD via the IPDET port. If the mode confirmation signal is applied to the VS1# and VS2# ports, the controller 222 can confirm that the security card is the IP-M-CARD and can recognize that the operation mode is the IP Card M-Mode.

If the security card is the M-CARD, the interface unit 234 of the security card may connect the IPDET pin to the VS2# pin. In other words, the CARD interface unit 234 may have a IPDET port for confirming the IP-M-CARD or the M-CARD.

If the IPDET pin is connected to the above VS2# pins in the security card, the controller 222 outputs a mode confirmation signal to the point of deployment (POD) via the IPDET port, and the mode confirmation signal is applied to the VS2# ports. In other words, if the security card is mounted to the host device, the controller 222 outputs the mode confirmation signal to the POD via the IPDET port. If the above mode confirmation signal is applied to the VS2# ports, it can be recognized that the security card is the M-CARD and the operation mode is the M-Mode.

The controller 222 is able to toggle the IPDET port to output the mode confirmation signal to the IPDET port. In particular, after the IPDET port has been toggled and if the VS1# and VS2# port is toggled, the controller 222 is able to confirm that the loaded security card is an IP-M-card.

FIG. 8 is a table illustrating a variety of signals provided from the host device to the security card, such that the operation mode recognized by the host device can be notified to the security card.

Referring to FIG. 8, if the controller 222 recognizes the operation mode as the IP Card M-Mode, the 'VPP1' port is set to 'Logic Low', and the 'VPP2' port is set to 'Logic Low'. If the controller 222 recognizes the operation mode as the M-Mode, the VPP1 port is set to 'Logic Low', and the VPP2 port is set to 'Logic High'. If the controller 222 recognizes the operation mode as the S-Mode, the VPP1 port is set to 'Logic High', and the VPP2 port is set to 'Logic High'.

The controller 222 detects status information of the ports (CP1# and CP2#), such that it determines whether the POD has been inserted according to the determined result. In other words, if each of the CD1# and CD2# ports is set to 'Logic Low', the controller 222 determines that the security card has been inserted. In more detail, if the security card is inserted into the host device, each of the CD1# and CD2# pins is maintained at 'Logic Low'. If the VS1# port is not set to 'Logic Low', the controller 222 determines that an improper card has been inserted, such that the operation for recognizing the security card can be interrupted.

The controller 222 confirms that the security card has been inserted. If the VS1# port is set to 'Logic Low', the controller 222 outputs the mode confirmation signal to the IPDET port, such that it confirms that the security card is the IP-M-CARD or the M-CARD using the above mode confirmation signal. In this case, after the mode confirmation signal has been transmitted to the IPDET port, if none of the VS1# and VS2# ports receives the mode confirmation signal, the controller 222 may perform the operation for confirming that the security card is the S-CARD.

In order to perform the above-mentioned confirmation of the S-CARD, the controller 222 performs parsing of Card Information Structure (CIS) information of the inserted security card using a personality change sequence. In this case, if the parsed CIS information is denoted by "OPENCABLE_POD_MODULE", the controller 222 confirms that the security card is the S-CARD, and recognizes that the operation mode is the S-Mode. Each of the VPP1 and VPP2 ports is set to 'Logic High'.

The controller 238 of the security card detects status information of the VPP1 and VPP2 pins to confirm the operation mode, and performs the self-initialization according to the confirmed operation mode. In other words, if the VPP1 pin is set to 'Logic Low' and the VPP2 pin is set to 'Logic Low', the controller 238 of the security card determines that the host device supports the IP Card M-Mode, and performs the self-initialization according to the determined result. If the VPP1 pin is set to 'Logic Low' and the VPP2 pin is set to 'Logic High', the controller 238 of the security card determines that the host device supports the M-Mode, and performs the self-initialization according to the determined result. If the VPP1 pin is set to 'Logic High' and the VPP2 pin is set to 'Logic High', the controller 238 of the security card determines that the host device supports the S-Mode, and performs the self-initialization according to the determined result.

Figure 9:
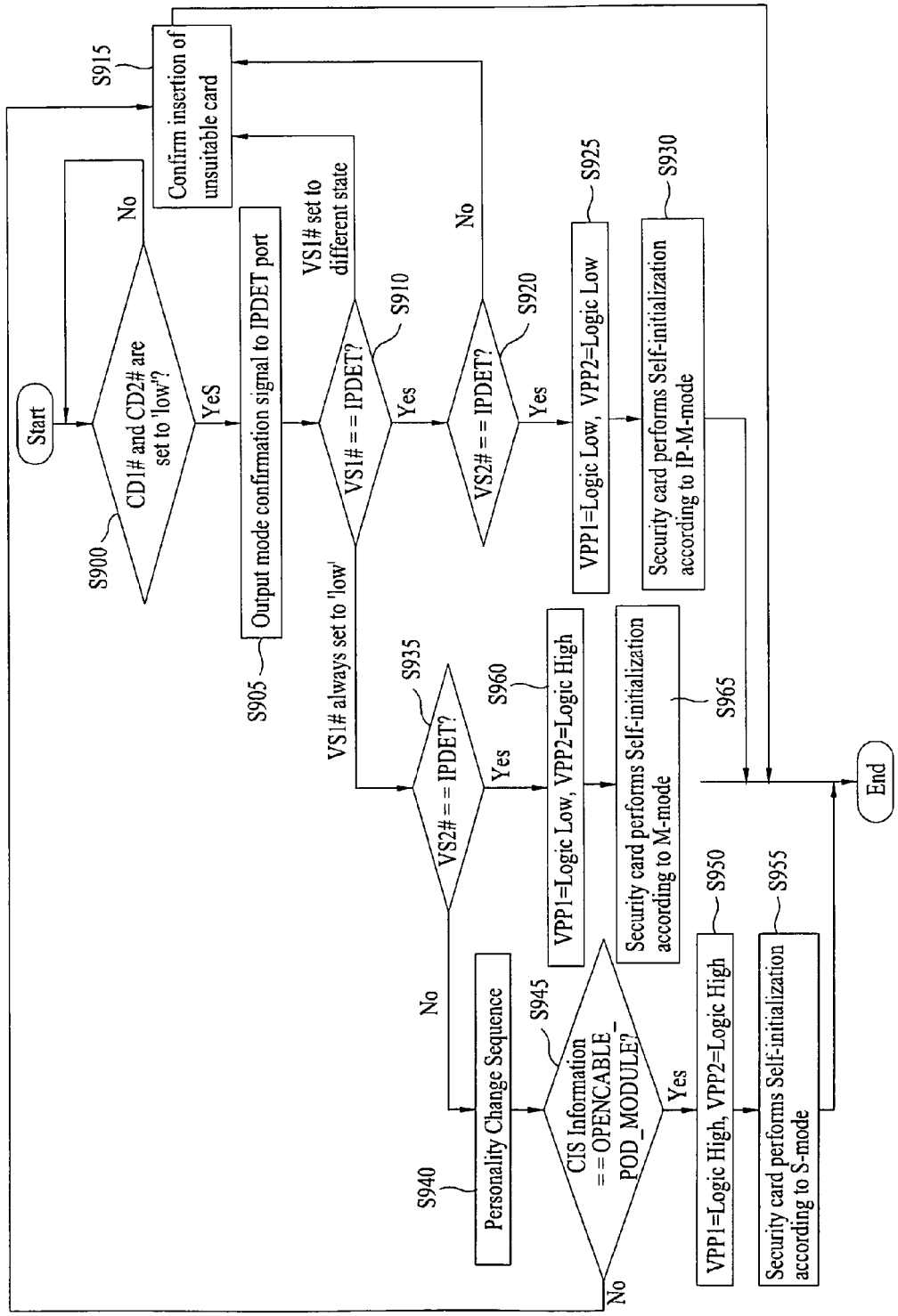
FIG. 9 is a diagram for performing a method of identifying an operation mode according to one embodiment of the present invention.

FIG. 9 is a flow chart illustrating a method for recognizing the operation mode according to the present invention.

Referring to FIG. 9, the controller 222 confirms status information of the CD1# and CD2# ports, and determines whether the security card has been inserted according to the confirmed status at step S900. In this case, if each of the CD1# and CD2# ports is set to 'Logic Low', the controller 222 is able to confirm the insertion of the security card.

The controller 222 outputs the mode confirmation signal to the security card via the IPDET port at step S905. The controller 222 determines whether the above mode confirmation signal has been received at the VS1# port at step S910. In this case, if the security card is the IP-M-Card, it is assumed that the interface unit 236 may transmit the signal transmitted at the IPDET pin to the VS1# and VS2# pins.

If the VS1# port receives no mode confirmation signal via the IPDET port, and the VS1# port has another status other than the above logic low status, the controller 222 confirms the insertion of the improper card, and stops the operation for recognizing the operation mode at step S915.

If the mode confirmation signal received via the IPDET port is applied to the VS1# port, the controller 222 determines whether the above mode confirmation signal has been applied to the VS2# port at step S920.

If the VS2# port receives no mode confirmation signal via the IPDET port, the controller 222 confirms that the improper card has been inserted at step S915, and stops the operation for recognizing the operation mode.

If the mode confirmation signal received via the IPDET port is applied to the VS2# port, the controller 222 sets the VPP1 port to 'Logic Low', and sets the VPP2 port to 'Logic Low' at step S925.

The controller 238 of the security card confirms that the VPP1 pin is set to 'Logic Low' and the VPP2 pin was set to 'Logic Low', such that it performs the self-initialization according to the IP Card M-Mode at step S930.

If the mode confirmation signal generated from the IPDET port is not applied to the VS1# port, but the VS1# port is continuously maintained at 'Logic Low', the controller 222 determines whether the mode confirmation signal has been received in the VS2# port at step S935. In this case, if the security card is determined to be the M-Card, it is assumed that the interface unit 236 may output the input signal of the IPDET pin to the VS2# pin.

If the above mode confirmation signal is not applied to the VS2# port, the controller 222 performs parsing of the information of the inserted security card using the personality change sequence at step S940. The controller 222 confirms that the parsed CIS information is "OPENCABLE_POD_MODULE" at step S945.

If the CIS information is not equal to "OPENCABLE_POD_MODULE", the controller 222 confirms that the improper card has been inserted at step S915, and stops the operation for recognizing the operation mode.

If the CIS information is "OPENCABLE_POD_MODULE" at step S945, the controller 222 sets the VPP1 port to 'Logic High', and sets the VPP2 port to 'Logic High' at step S950. The controller 238 of the security card confirms that the VPP1 pin was set to 'Logic High' and the VPP2 pin was set to 'Logic High', such that it performs the self-initialization according to the S-Mode at step S955.

If the mode confirmation signal is applied to the VS2# port, the controller 222 sets the VPP1 port to 'Logic Low', and sets the VPP2 port to 'Logic High' at step S960.

The controller 238 of the security card confirms that the VPP1 pin is set to 'Logic Low' and the VPP2 pin was set to 'Logic High', such that it performs the self-initialization according to the M-Mode at step S965.

FIG. 10 is a flow chart illustrating a method for recognizing the operation mode according to the present invention.

Referring to FIG. 10, the controller 222 confirms status information of the CD1# and CD2# ports at step S1000. In this case, if each of the CD1# and CD2# ports is set to 'Logic Low', the controller 222 is able to confirm that security card has been inserted.

If the security card has been inserted, the controller 222 determines whether 'VS1#' is set to 'Logic Low' at step S1005. If 'VS1#' is not set to 'Logic Low', the controller 222 confirms the improper insertion of the improper card, and stops the operation for recognizing the operation mode at step S1010.

The controller 222 outputs the mode confirmation signal to the security card via the IPDET port at step S1015. The controller 222 determines whether the above mode confirmation signal has been received at the VS2# port at step S1020. In this case, if the security card is the M-Card, it is assumed that the interface unit 236 may transmit the signal transmitted at the IPDET pin to the VS2# pin.

If the VS2# port receives no mode confirmation signal via the IPDET port, and the VS2# port has another status other than the above logic low status, the controller 222 confirms the insertion of the improper card, and stops the operation for recognizing the operation mode at step S1010.

If the VS2# port receives no mode confirmation signal via the IPDET port and is then maintained at 'Logic Low', the controller 222 performs parsing of the information of the inserted security card using the personality change sequence at step S1025. The controller 222 confirms that the parsed CIS information is "OPENCABLE_POD_MODULE" at step S1030.

If the CIS information is not equal to "OPENCABLE_POD_MODULE", the controller 222 confirms that the improper card has been inserted at step S1010, and stops the operation for recognizing the operation mode.

If the CIS information is "OPENCABLE_POD_MODULE", the controller 222 sets the VPP1 port to 'Logic High', and sets the VPP2 port to 'Logic High' at step S1035. The controller 238 of the security card confirms that the VPP1 pin was set to 'Logic High' and the VPP2 pin was set to 'Logic High', such that it performs the self-initialization according to the S-Mode at step S1040.

If the mode confirmation signal received via the IPDET port is applied to the VS2# port, the controller 222 determines whether the above mode confirmation signal has been applied to the VS1# port at step S1045. In this case, if the security card is determined to be the IP-M-Card, it is assumed that the interface unit 236 may output the input signal of the IPDET pin to the VS1# and VS2# pins.

If the mode confirmation signal received via the IPDET port is not applied to the VS1# port, the controller 222 sets the VPP1 port to 'Logic Low', and sets the VPP2 port to 'Logic high' at step S1050.

The controller 238 of the security card confirms that the VPP1 pin is set to 'Logic Low' and the VPP2 pin was set to 'Logic High', such that it performs the self-initialization according to the M-Mode at step S1055.

If the mode confirmation signal is applied to the VS1# port, the controller 222 sets the VPP1 port to 'Logic Low', and sets the VPP2 port to 'Logic Low' at step S1060.

The controller 238 of the security card confirms that the VPP1 pin is set to 'Logic Low' and the VPP2 pin was set to 'Logic Low', such that it performs the self-initialization according to the IP Card M-Mode at step S1065.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A host device interfacing with a point of deployment (POD), the host device comprising:
    an internet protocol (IP) physical interface unit configured to receive an Ethernet frame including an IP packet which contains first moving picture experts group (MPEG) transport stream (TS) packets through an IP network which is external to the host device;
    a broadband interface unit configured to receive a cable broadcast signal delivering second MPEG TS packets through a cable;
    a demodulating unit configured to demodulate the cable broadcast signal;
    a routing engine configured to route the IP packet based on destination information included in the Ethernet frame;
    a decapsulator configured to extract the first MPEG TS packets from the IP packet; and
    a multiplexer, which is located at the host device, configured to multiplex the first MPEG TS packets extracted from the IP packet and second MPEG TS packets delivered in the cable broadcast signal and send the multiplexed first and second MPEG TS packets to the POD.

2. The host device according to claim 1, wherein an interface unit includes a VPP port including a first VPP port and a second VPP port used to control the inserted POD to be initialized a multiple mode of an IP card, and wherein a controller sets the first VPP port to 'Logic Low', and the second VPP port to 'Logic Low'.

3. The host device according to claim 2, wherein the interface unit further includes a CD port including a first CD port and a second CD port used to identify whether or not the POD is inserted in the host device, and wherein the controller determines whether the POD is inserted in the host device according to values of the first CD port and the second CD port.

4. The host device according to claim 3, wherein the controller recognizes a type of the inserted POD based on both values of a VS port.

5. The host device according to claim 1, wherein a controller controls a VS port to be toggled the output of a mode confirmation signal.

6. The host device according to claim 4, wherein the controller recognizes that the type of the inserted POD is the IP card if an outputted mode confirmation signal has been returned from the VS port.

7. A method of processing broadcast data in a host device interfacing with a point of deployment (POD), the method comprising:
    receiving an Ethernet frame including an internet protocol (IP) packet which contains a first moving picture experts group (MPEG) transport stream (TS) packet through an IP network ,and a cable broadcast signal delivering a second MPEG TS packet through a cable;
    demodulating the cable broadcast signal;
    routing the IP packet based on destination information included in the Ethernet frame;
    extracting the first MPEG TS packet from the IP packet;
    multiplexing the first MPEG TS packets extracted from the IP packet and second MPEG TS packets delivered in the cable broadcast signal, by a multiplexer which is located at the host device; and
    sending the multiplexed first and second MPEG TS packets to the POD.

8. The method according to claim 7, wherein an interface unit includes a VPP port comprising a first VPP port and a second VPP port used to control the inserted POD to be initialized a multiple mode of an IP card, and wherein the step of controlling the inserted POD further comprises setting the first VPP port to 'Logic Low' and the second VPP port to 'Logic Low'.

9. The method according to claim 7, wherein an interface unit includes a CD port comprising a first CD port and a second CD port used to identify whether the POD is inserted or not according to values of the first CD port and the second CD port.

10. The method according to claim 7, wherein the host device outputs a mode confirmation signal to the POD via a VS port by toggling a first VS port and a second VS port.

11. The method according to claim 9, wherein the host device recognizes a type of the inserted POD based on values of a VS port.

12. The method according to claim 11, wherein the host device recognizes that the type of the inserted POD is the IP card if an outputted mode confirmation signal has been returned from the VS port.

* * * * *